United States Patent [19]

Rice

[11] Patent Number: 5,021,979
[45] Date of Patent: Jun. 4, 1991

[54] CALIBRATION APPARATUS FOR A LIGHT SOURCE USED FOR EXPOSING PHOTOGRAPHIC FILM WITH IMAGE DATA

[75] Inventor: Richard C. Rice, Oconomowoc, Wis.

[73] Assignee: Camtronics, Ltd., Wukesha, Wis.

[21] Appl. No.: 341,731

[22] Filed: Apr. 21, 1989

[51] Int. Cl.⁵ .................. G03B 27/80; G01J 3/50
[52] U.S. Cl. .................. 364/525; 364/571.01; 356/404; 356/443; 382/41
[58] Field of Search ............ 364/525, 571.01, 571.05; 356/404, 408, 443, 379; 382/41

[56] References Cited

U.S. PATENT DOCUMENTS

| | | | |
|---|---|---|---|
| 4,646,252 | 2/1987 | Terashita | 364/525 |
| 4,666,307 | 5/1987 | Matsumoto et al. | 364/525 |
| 4,809,198 | 2/1989 | Terashita | 364/525 |
| 4,855,940 | 8/1989 | Richardson et al. | 364/525 |
| 4,884,221 | 11/1989 | Sugiyama et al. | 364/525 |

Primary Examiner—P. S. Lall
Assistant Examiner—Brian M. Mattson

[57] ABSTRACT

Apparatus creates an image on photographic film in which the light intensity of the light source for exposing the film is calibrated to a predetermined value by measuring the light intensity of the light exposure while varying the digital form of the drive signal for controlling the intensity. A successive approximation sequence is used until the intensity approximates the predetermined value.

9 Claims, 3 Drawing Sheets

CALIBRATION APPARATUS FOR A LIGHT SOURCE USED FOR EXPOSING PHOTOGRAPHIC FILM WITH IMAGE DATA

BACKGROUND OF THE INVENTION

1. Related Applications

The present application is related in subject matter to the following U.S. patent applications filed simultaneously herewith: Ser. No. 341,726 filed in the names of Barry N. Stone, Richard C. Rice, John E. Lorbiecki and Stanley Berstein and entitled APPARATUS AND METHOD FOR CONTROLLING FILM DENSITY FOR AN APPARATUS FOR EXPOSING PHOTOGRAPHIC FILM WITH IMAGE DATA; and Ser. No. 341,730 filed in the names of Richard C. Rice, Barry N. Stone and Lynn J. Orendcrff and entitled SYSTEM AND METHOD FOR CONTROLLING EXPOSURE FORMAT FOR AN APPARATUS FOR EXPOSING PHOTOGRAPHIC FILM WITH IMAGE DATA.

2. Field of the Invention

The present invention generally relates to apparatuses for exposing photographic film with image data and, in particular, to calibration of the light source for such apparatuses.

3. Statement of the Prior Art

Photographic film has become the accepted archival medium for medical imaging because of its high analog resolution and because of its long time use with x-rays. Conversely, modern medical imaging techniques, such as computerized tomography, digital radiographic imaging, ultrasound and magnetic resonance imaging, have developed around the use of digital imaging techniques where an image is made up of a great many pixels each of which has an electronically represented brightness. In order to adapt these new techniques to the accepted archival medium, apparatuses have been developed for creating a hard copy by "printing" the electronic image data onto photographic film. These apparatuses are generally referred to as hard-copy cameras.

Thus far, the two primary approaches have used lasers and cathode ray tubes as light sources to expose the film by illuminating each pixel to the proper intensity. Cathode ray tubes at least have experienced some problems in controlling the exposure or writing intensity because of the inherent instability of the cathode ray tube intensity. This varies readily with temperature and causes calibration over a range of intensities to be practically impossible. Thus, it is desirable to have a conveniently implemented calibration procedure which may be regularly used to maintain proper exposure intensity.

One attempt at controlling the various factors involved is described in U.S. Pat. No. 4,700,058. This patent describes a scheme for calibrating exposure intensity against a pair of predetermined reference levels. This is done both before a measurement of film density and during the exposure process to retain the validity of the density measurements as well as maintain the intensity stability. Unfortunately, this approach is limited to the number of reference voltages set up for comparison, and the reference voltages have no relation to the intensities determined to produce desired film densities. Therefore, it is possible that as "calibrated", the actual light intensity levels differ significantly from the light intensity levels corresponding to the densities at which the film is measured. In other words, the film density may be measured using one set of exposure intensity levels while the exposure intensity is calibrated at a different level. This condition can introduce gray scale inaccuracies due to the nonlinear responses of the light source, the film and the developing chemicals.

SUMMARY OF THE INVENTION

Accordingly, the present invention provides a calibration scheme having great flexibility to allow calibration at any number of intensity levels, which levels are determinable during the normal operation of the apparatus. This is accomplished intrinsicly with the apparatus control and does not significantly hinder productivity. The present invention is provIded in an apparatus for exposing photographic film with image data using a light source, wherein the improvement comprises means for measuring exposure light intensity from the light source, digital to analog converter means for controlling the intensity level of the light source, and computer control means coupled to the digital to analog converter and the intensity measuring means and including instruction means responsive to the intensity measuring means and a predetermined intensity level for producing a digital signal for calibrating the intensity of the light source by successively approximating digits of the digital signal.

In an alternate embodiment, the improvement comprises means or measuring exposure light intensity from the light, means for comparing the measured light intensity against a reference source, digital to analog converter means for controlling the intensity level of the light source, and means, coupled to the digital to analog converter means and responsive to the means for comparing, for producing a digital signal for calibrating the intensity of the light source by successively approximating digits of the digital signal.

A BRIEF DESCRIPTION OF THE DRAWINGS

The present invention is illustratively described with respect to the accompanying drawings of which.

DETAILED DESCRIPTION OF THE DRAWINGS

Figure 1:
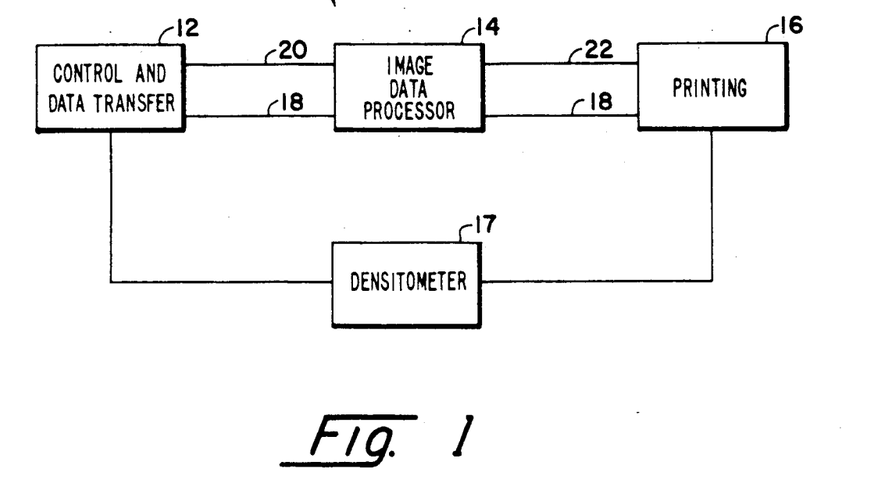
FIG. 1 is a system block diagram of one embodiment of the present invention.

FIG. 1 generally shows a system for producing hard copy film images from digitized image data. Generally included are a Control and Data Transfer section 12, an Image Data Processor section 14, a Printing section 16 and a densitometer 17. The Control and Data section 12 would typically include a computerized control for the entire system 10 along with means for inputting, transferring and causing the printing of image data. The Image Data Processor section 14 would typically include a frame memory for storing an image to be printed and some form of processor for handling the data and converting it into proper form for printing. The Image Data Processor section 14 is coupled to the control section 12 by means of a data bus 18 and an address bus 20 along with other known control lines, not shown. Printing section 16 would include the actual printing mechanism including a source of light, an optical mechanism and the film to be exposed. Also included would be the position and intensity controls for the light source. Printing section 16 is coupled to receive image data from the image Data Processor section 14 via a separate data bus 22. Densitometer 17 includes means for generating a signal responsive to the density or light transmittance of developed film previously processed in Printing section 16.

Figure 2:
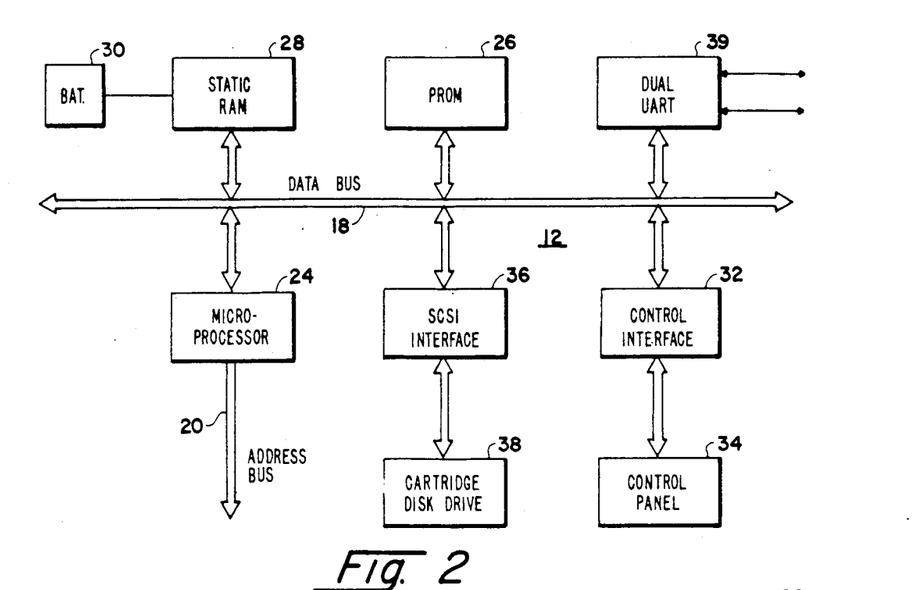
FIG. 2 is a block diagram of a portion of the system of FIG. 1.

FIG. 2 shows greater detail for the Control and Data Transfer section 12. This section is constructed in the manner of a common microprocessor controlled computer and even uses a common Intel 80186 as the microprocessor 24. Microprocessor 24 is coupled to other modules in the system via the data bus 18 and the address bus 20 A programmable read only memory (PROM) 26 stores programmed instructions for the microprocessor 24. A static random access memory (SRAM) 28, along with a battery backup 30, are used for the long term storage of data which varies during the system operation. A control interface 32 and control panel 34 allow for operator interface with the microprocessor 24, and a SCSI interface 36 provides communication with the cartridge disc drive 38 to allow the inputting of image data into the entire processing system. Any suitable drive 38 may be used which has removable disks to allow the transfer of image data from various imaging apparatuses to the present system. Lastly, a dual UART (universal asynchronous receiver transmitter) 39 provides two channels of serial communication for the microprocesser 24.

Figure 3:
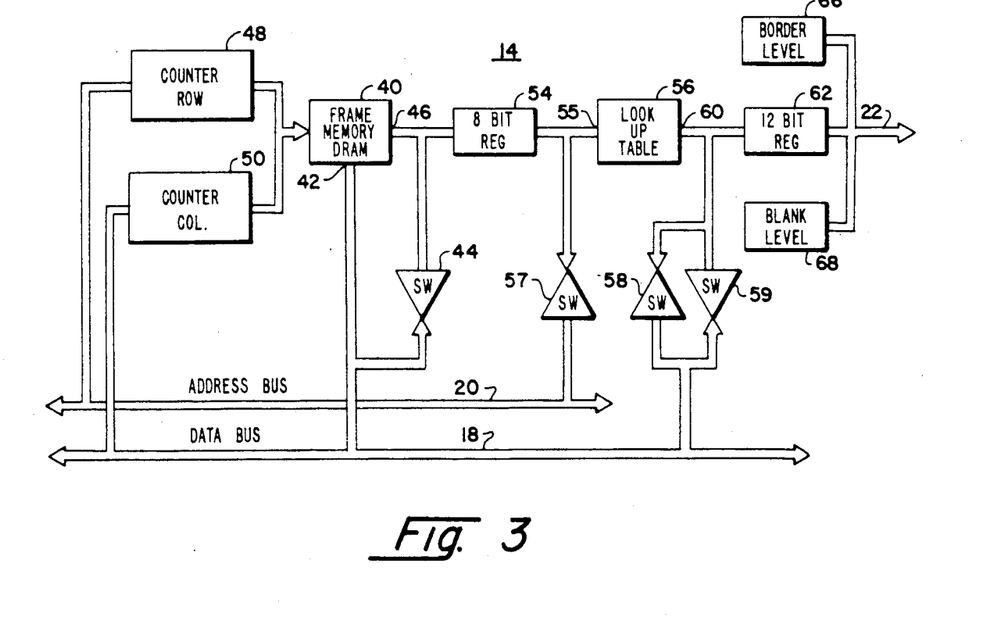
FIG. 3 is a block diagram of another portion of the system of FIG. 1.

FIG. 3 shows greater detail for the Image Data Processor 14. As mentioned, a frame memory 40 is included which is coupled to the data bus 18 at both its input 42 and its output 46 via a switch 44. This allows the inputting of data and the retrieval of data through the data bus 18 for the purpose of testing the memory 40. The frame memory 40 is addressed by a pair of counters 48 and 50 which are controlled by the address bus 20 and data bus 18, respectively. Counters 48 and 50 are both 10 bit counters for addressing the rows and columns of memory 40' respectively, and are coupled thereto via a bus 52. Thus, in this embodiment, the memory 40 has a capacity of approximately one megabyte by 8 bits for storing an image as large as 1,024 by 1,024 pixels.

Image data is transferred from memory 40 in a pipe lined manner. The output 46 of memory 40 is coupled to an 8 bit register 54 for latching image data from memory 40 one pixel at a time. Image data is coupled from register 54 to the addressing input 55 of a look-up table 56.

Look-up table 56 has 256 addresses for the 8 bits of input data and 12 bits of intensity data at each of the 256 addresses. This enables expansion of the intensity data from 8 to 12 bits and allows various weighting to be applied to different ranges of the intensity data. This provides implementation of gamma correction, a well known technique which is typically implemented in analog form. This digital implementation is inherently more adjustable and stable. The look-up table 56 may be addressed from the microprocessor 24 via the address bus 20 and a switch 57, while data may be transferred to and from the table 56 via the data bus 18 and switches 58 an 59.

The data output 60 of look-up table 56 is coupled to a 12 bit register 62 to allow transfer of the data from the table 56. The 12 bit output bus 22 is coupled to the register 62, a border intensity level memory 66 and a blanking intensity level memory 68. By these means, the entire spectrum of image data for each image may be transferred to the printing section 16 for exposure onto photographic film.

Figure 4:
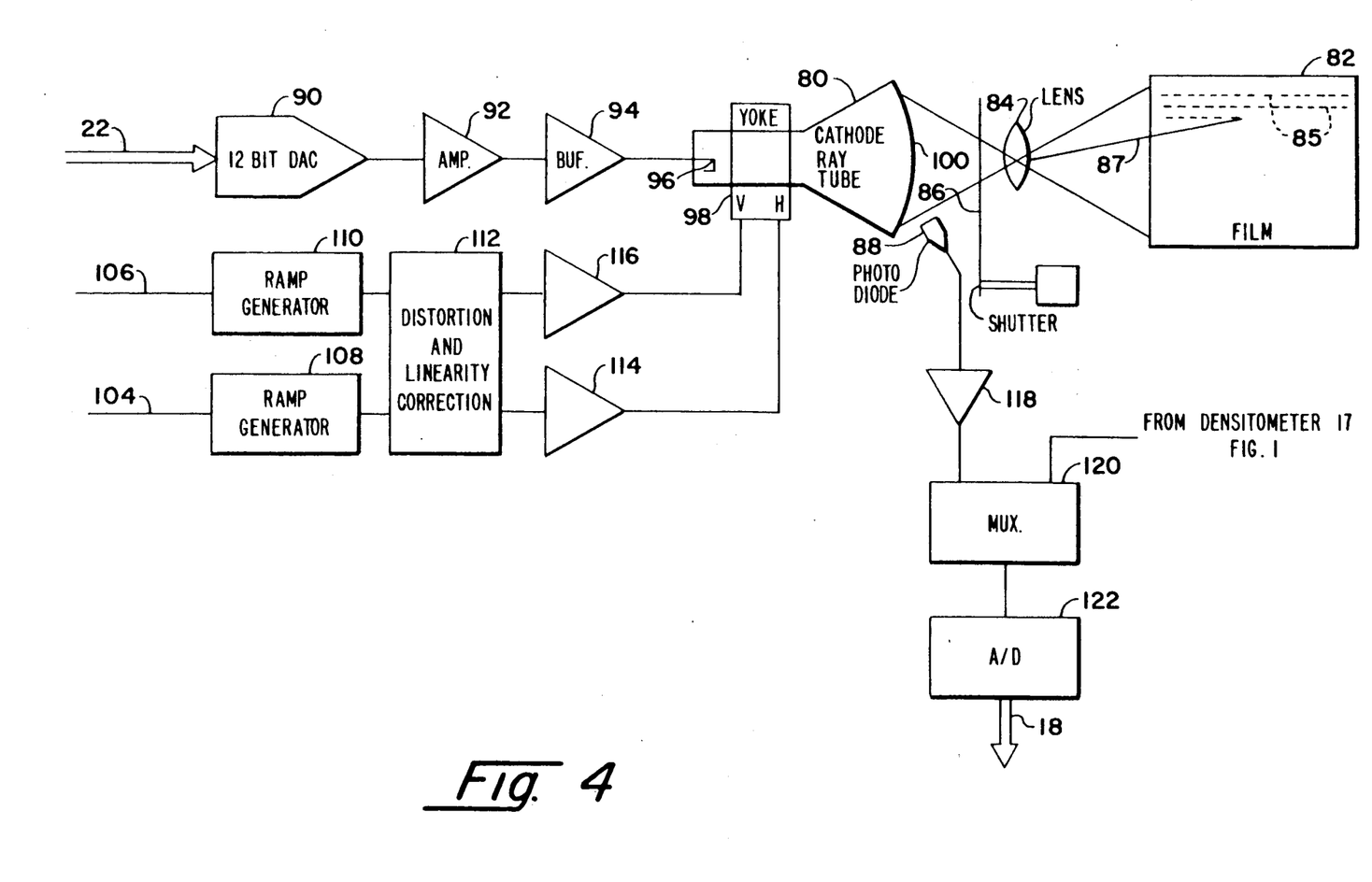
FIG. 4 is a more detailed drawing of a portion of the embodiment of FIG. 1.

FIG. 4 shows further detail on the Printing section 16 which actually exposes the photographic film in accordance with the image data delivered from the Image Data Processor 14. FIG. 4 representationally shows the cathode ray tube (CRT) 80 which acts as a light source for exposing the film 82 along with an optical lense 84 and a shutter mechanism and motor 86. CRT 80 produces a beam of light 87 which is scanned over the film 82 to expose each pixel of an image. Film 82 is shown to be turned ninety degrees out from CRT 80 solely for demonstrating a scanning pattern.

Further included in the exposure apparatus is a photo diode which is used to measure the exposure intensity produced by the CRT 80 for the purpose of ultimately controlling the photo density of the exposed film 82. Photodiode 88 is set back somewhat from the surface 100 of CRT 80 in order to receive light from more than just a small area of the surface. This is done to average the light of an area of the surface to prevent adverse effects from any spot irregularities.

The image data is received from the 12 bit output data bus 22 of FIG. 3 by a 12 bit digital to analog converter (DAC) 90. The output of DAC 90 is an analog signal proportional to the intensity information contained in the digital image data. This analog signal is amplified by video amplifier 92 and coupled through a buffer 94 to the cathode 96 of CRT 80 In this manner, the digital image data is used to control the intensity of each pixel produced by the electron beam of CRT 80.

CRT 80 further includes a horizontal and vertical deflection yoke 98 which controls the point at which the electron beam of CRT 80 impacts the front surface 100 thereof and correspondingly where the light beam 87 strikes the film 82. The control yoke 98 is coupled to and controlled by horizontal and vertical deflection control circuitry 102. Circuitry 102 receives horizontal and vertical synchronization (sync) signals 104, 106, respectively, from the mIcroprocessor 24. The sync signals control ramp generators 108 and 110. These ramp generators are the primary position determining components for the electron beam of CRT 80. The ramp signals produced by generators 108 and 110 are coupled through a distortion and linearity correction circuit 112 which corrects for image nonlinearity and the pin cushion effect caused at corners of the image. The resulting corrected horizontal and vertical drive signals are coupled through amplifiers 114 and 116, respectively, to the coils of yoke 98.

Photo diode 88 is connected through an amplifier 118 to one input of a multiplexer 120. The other input of the multiplexer is connected to receive the output of densitometer 17, as described hereinafter. In this manner photo diode 88 and other analog the output of densitometer 17 are coupled to an analog to digital converter (A/D) 122 which produces digital signals for coupling through the data bus 18 to microprocessor 24. Converter 122 is of the type which either averages or integrates the input signal over a predetermined period of time. One such converter which performs this function is a dual-slope converter. The period of time is typically one line cycle of the power supply (i.e. 60 Hz.). This causes the averaging out of any supply based interference.

Figure 5:
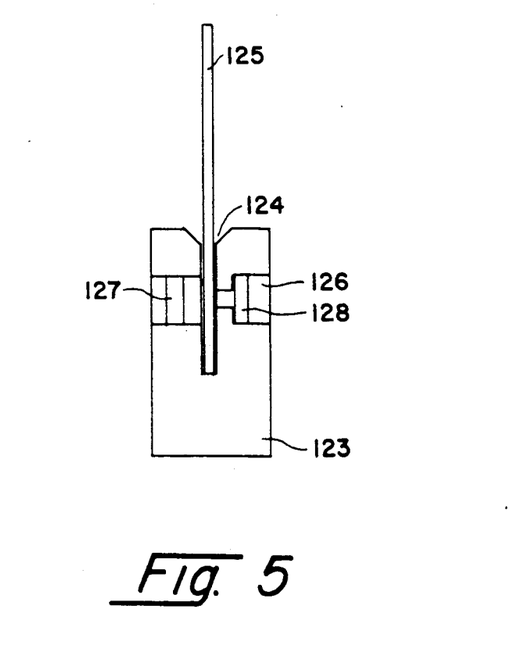
FIG. 5 is a side view of a portion of the embodiment of FIG. 1.

FIG. 5 shows a side view of greater detail of the densitometer 17 of FIG. 1. Although referred to as a densitometer, the member 17 is not required to measure density against any standard. The densitometer required for the present embodiment merely needs to be sufficient to generate an electrical signal which is responsive to and a function of the relative density or transmittance of different portions of developed film, i.e., as the density or transmittance values of different portions of the developed film relate to one another. For this purpose, a member 123 is shown which has a centrally located slot 124 for receiving a piece of developed film 125. Member 123 also includes a channel 126 which intersects slot 124 and is located generally orthogonally with respect thereto. Affixed within channel 126 and on separate sides of slot 124 are a light emitting diode LED 127 and a photodiode 128 so that LED 127 provides a beam of light toward the photodiode along an axis normal to the film plane. The LED 127 is powered by a regulated power supply, not shown, to provide a light source having short term stability sufficient for the measurement period of the present embodiment.

A stepper motor, not shown, is used to move the member 123 orthogonally with respect to the plane of the drawing figure and along a portion of the film 125 so that the beam from LED 127 traces the path through a predetermined portion of the developed film. The stepper motor is control appropriate drive circuitry by the microprocessor 24.

THEORY OF OPERATION

As mentioned, the entire apparatus is controlled by microprocessor 24 in accordance with program instructions stored in PROM 26. These program instructions are set forth generally in Table 1 which is described in greater detail below.

In general, the first step of the printing process generally includes a film transmittance test upon which calibration of the exposure or writing intensity is based. The transmittance test determines relative standard black and white film densities or transmittance in accordance with industry standards, as a factor of the base plus fog transmittance of the actual film being used. This allows monitoring of the developing process to compensate for variations in film response and chemical usage and age. The transmittance test is typically performed at the beginning of each day and at the start of each new package of film. It may also be performed at any time at the option of the operator. Thus, any suspect conditions may be tested for and compensated for throughout the printing process.

The transmittance test is performed by exposing a piece of film with a pair of gray scales centered around approximated standard black and white exposure intensity levels. Also included is a substantially clear portion of the film. The writing intensity of each gray scale step is known. These intensities may be factory set or stored in the static RAM 28 from a previously run transmittance test.

After the film is developed, it is placed in the densitometer 17. A transmittance signal is generated by the densitometer responsive to the relative densities or transmittance of the gray scale steps, including the clear portion. The microprocessor 24 then takes the signal level representing the clear portion and calculates transmittance signal levels representing relative standard black and white film densities based upon the clear film portion. Based upon the calculated standard transmittance signal levels, the transmittance signal for the gray scale steps and the known exposure intensities used to produce the gray scale steps, it is possible for microprocessor 24 to determine the exposure intensities that are necessary to produce each of the standard densities. These intensities are referred to as the standard black and white exposure intensities. They may be determined by any suitable method.

Each standard exposure intensity may be interpolated from the two exposure intensities corresponding to the transmittance signal level measured on either side of the calculated standard transmittance signal level. It may alternatively be desirable to perform a second exposure procedure in order to more accurately determine the standard exposure intensities. This would be done using a smaller overall range of exposure intensities around each of the values determined from the first exposure procedure. The range may even be defined by using the measured film transmittances and their respective exposure intensities, which bracket each of the calculated standard transmittance signal levels, as the minimum and maximum levels for the second set of gray scales which are exposed on a second piece of film. The results developed from the second exposure may then be used to interpolate more accurate exposure Intensities for the calculated standard black and white film densities. Using the second exposure process, eliminates nonlinearities are eliminated which would degrade the accuracy oF interpolation after the first exposure process.

It is also possible to base the first exposure process on a narrower range of exposure intensities. However, this may require repetition of the exposure if the calculated standard transmittance signal levels are outside of either or both of the gray scale transmittance signal ranges produced.

Once again, the end result of the film transmittance test is the determination of standard exposure intensity levels which may be measured by photodiode 88 so that the intensity output of CRT 80 may be accurately calibrated.

Once the standard exposure intensities for black and white are determined, the apparatus is ready for use in the printing process. The operator typically inserts a disk cartridge into the disk drive 38, which disk cartridge includes image data to be printed. The image data may be recorded on the disk by any suitable means. Imaging apparatuses may be adapted to record the image data onto disks.

The image data may have any one of a wide variety of formats of horizontal lines of image pixels. That is, the images may have any given number of lines and any given number of pixels per line. The particular format of the image data is noted in a header block on the cartridge disk so that microprocessor 24 may read the header block and determine how many images are on the disk, what the format of those images is and where those images are located on the disk. The disk may also be used to carry gamma correction information from the particular instrument which produced the images. Because of the flexibility of the formatting of the images, this system may accept disks from a variety of different types of imaging instruments. Such different instruments may require different gamma correction schemes for either linearizing or enhancing various ranges of intensity.

Once the microprocessor 24 has determined the format of the stored image data, it can then calculate the exposure format which it will use to reproduce the image on film. This initial format determination is made simply with respect to the number of horizontal lines located in the vertical direction on the image. This is done for purposes of calibrating the CRT intensity levels through the setting of the intensity values of look-up table 56. the formatting of the number of pixels per line does not affect exposure intensity and thus is not determined at this point.

The present embodiment prints each horizontal line of image data as a plurality of overlapping exposure lines 85 each of which is separately produced by the light beam 87. The number of successive exposure lines and the spacing of all of the exposure lines over the image is varied depending upon the format of the image data on the disk and the desired exposure format or final print size on the film 82. This variability allows the present invention to accept images having different image data formats.

For example, images typically have between 400 and 1000 horizontal lines. For formats having up to approximately 500 lines, the number of successive exposure lines per image line of data would be 4. For 500 to 700 lines, the repetition would be 3, and for 700 to 1000 lines, the repetition would be 2. The amount of overlap between successive lines depends upon the spot size or line width and the spacing of the lines. It is preferred that the spacing be less than the spot size or line width in order to cause overlapping. It should be noted that successive image lines are allowed to overlap to remove the appearance of raster lines.

In the actual exposure process, the number and the spacing of the horizontal lines is controlled by the horizontal sync signal on line 104 from microprocessor 24. The vertical ramp generator 110 operates constantly while the horizontal sync signals are controllably delayed to provide a controllable spacing for successive exposure lines. Because the CRT scan rate is arbitrarily set by the present embodiment and is not run at the normal high video presentation rate of 30 frames per second, great flexibility is available for the timing control of the horizontal sync signals.

As mentioned, once microprocessor 24 determines the data format of the image data on the disk cartridge, it determines the repetition rate and line spacing for the actual printing process. Microprocessor 24 then takes this spacing and produces separate black and white test patterns on the CRT 80, which patterns are sensed by the photodiode 88 for intensity level and adjusted until the so measured intensity levels match the standard exposure intensity levels determined from the film transmittance test.

The method of adjustment used may be described as successive approximation. The twelve bits of input data for DAC 90 are controlled by microprocessor 24 which sets the contents of register 62. Each of the twelve bits, which are originally set high, is sequentially switched low proceeding from the most to the least significant bit. After each switching, the photodiode 88 is tested to see if its output, as measured by A/D 122, is either above or below the stored standard intensity value. If photodiode 88 indicates a low reading, the next sequential bit is switched. If the indication is high, the bit just switched is reset high and then the next sequential bit is switched low. When the process is completed, the intensity level measured by photodiode 88 is the same as that stored for the particular standard intensity value being set.

When the CRT output is adjusted to produce the same intensity values as those stored for the standard intensities, the digital signals inputted to DAC 90 for producing each of these signals are then stored in look-up table 56 along with gray scale intermediate data as determined by microprocessor 24. This gray scale data may be linear or nonlinear and may implement a gamma correction function.

The next step in the printing process includes determining the horizontal output rate for the frame memory 40. This horizontal output rate is varied in order to allow image data of whatever size to fit in the desired size for the final printing. The adjustment is made by simply varying the horizontal pixel output rate from frame memory 40. Each pixel on a horizontal line of the image is held at the output 46 of frame memory 40 for a controllable number of system clock pulses, depending upon the determined printing format. Each horizontal pixel may be held at the output for the same amount of time, or the amount of time may be varied between each pixel so that an image data format of a given number of pixels will fit the fixed output image size, or exposure format, using a fixed microprocessor clock rate. For example, horizontal pixels may be alternately output for six and seven clock pulses across the entire width of the image in order to cause a proper fit of the given image data format within the fixed exposure format. The same output clock pulsing is repeated for each horizontal line with the result of no noticeable distortion to the printed image.

Once the vertical repetition and overlap rate and the horizontal pixel output rate are determined, an image is transferred to the frame memory 40 and printed. Subsequent images on the same image data disk are printed using the same exposure format settings. If images having a different data format are to be printed, the DAC values for look-up table 56 must be reset to produce the standard exposure intensity values for the new format. If the package of film or any other density sensitive factor changes, the film transmittance test will be rerun to produce new standard black and white exposure intensities. Also, the DAC values of look-up table 56 will be reset. The above process is controlled by microprocessor 24 in accordance with program instructions stored in PROM 26. These program instructions are represented in the steps set forth in Table 1.

TABLE 1

| PROGRAM STEPS |
|---|
| 130 Initialization |
| 132 Film transmittance Test |
|     134 Intensity Calibration |
|         136 Find black reference intensity spread |
|         138 Find white reference intensity spread |
|         140 Calibrate 19 intensities for 1024 ppl + 512 lpf |
|     142 Expose gray scales |
|     144 Measure developed film transmittance |
|     146 Cal. ref. black and white transmittance signal levels |
|     148 Approx. reference intensities and determine fine range |
|     150 Determine new intensity readings |
|     152 Intensity Calibrate fine range |
|     154 Expose gray scales |
|     156 Measure fine gray scale transmittance |
|     158 Interpolate black and white intensity levels |
| 160 Determine image format |
| 162 Determine exposure format |
| 164 Calibrate black and white intensities |
|     166 Find white dac valve |
|     168 Find black dac valve |
| 170 Fill in Look-up Table |

TABLE 1-continued

PROGRAM STEPS

172 Determine pixel clock rate
174 Image data to memory 40
176 Print image

More specifically, when the apparatus is first turned on, the microprocessor 24 goes through a common initialization sequence 130. At this point, all of the system components which may be tested by the microprocessor 24, including itself, can be so tested. Microprocessor 24 is then ready to control the apparatus to perform its intended functions.

After the initialization step 130, the operator typically initiates a film transmittance test 132 which includes several program substeps 134-158. The first general step of a film transmittance test is referred to as the Intensity Calibration step 134 which calibrates the CRT intensity for a gradation or gray scale of intensity levels around each of a pair of approximated standard black and white exposure intensity levels. Step 136 takes the desired approximated intensity reading for the black reference and determines a spread of intensity readings thereabout. Step 138 takes the approximated white intensity reading and determines a spread of white intensities beginning with base plus fog. Step 140 performs the actual calibration process for the CRT intensity for 19 different intensity levels, 10 around the black reference and 9 plus a clear density portion around the white reference, all based upon an exposure format of 1024 pixels per line (ppl) and 512 lines per frame (lpf). The density of the clear portion is commonly referred to as base plus fog. The calibration process is performed by the same successive approximation technique as is described above. It is performed for each of the 19 gray scale steps around the black and white reference values.

Once the 19 exposure intensity levels are calibrated, step 142 exposes a piece of film with a pair of gray scales around each of the black and white standard intensities. This exposure is done as two separate steps, one for each of the black and white gray scale patterns.

Once the film is exposed, the operator removes it from the instrument and passes it through the developing process. After developing, the film is placed in the densitometer 17, and step 144 measures the relative density or transmittance between each of the 19 gray scale portions in addition to the base plus fog area. This is accomplished by generating a transmittance signal which is responsive to the various densities on the film. The stepper motor is used to move the member 123 past each of the gray scale steps while the transmittance signal is read from photodiode 128 and converted to a digital value by A/D 122.

With the base plus fog transmittance signal level, program step 146 can then calculate the transmittance signal levels corresponding to standard black and white densities which have been standardized by the industry as a percentage of the base plus fog reading for the film. Once the black and white transmittance signal level calculations are made, a comparison is made by step 148 against the 19 gray scale relative transmittance measurements to determine which two transmittance signal levels bracket each of the calculated standard transmittance signal levels.

At this point, it is possible to either interpolate the necessary exposure intensity levels for producing the calculated transmittance or to perform another exposure step to further refine the measurement. Because the exposure process is nonlinear, it is preferable to perform another gray scale exposure process to get closer to the actual transmittance readings and thereby minimize inaccuracies from a linear interpolation process. For this purpose, step 150 approximates the reference intensities and determines a new set of intensity readings for gray scales located around the approximated intensities. Step 152 then calibrates this fine range of intensity values as in step 34. The operator then inserts another piece of film and step 154 again exposes a pair of gray scales intended to narrowly bracket the calculated black and white transmittance signal levels. After this piece of film is developed, it is inserted into the densitometer 17 which is controlled by step 156 to measure the fine gray scale transmittance values. The microprocessor 24 again has available to it, calibrated and measured intensity levels which produced measured film transmittance signal levels. It uses the measured levels in comparison with the calculated black and white film transmittance signal levels of step 146 to determine the intensity levels at which it should calibrate CRT 80 to produce the calculated standard black and white transmittance levels. Step 158 thereby interpolates the black and white intensity levels based upon the calculated black and white film transmittance signal levels to determine the standard black and white exposure intensities.

Once the film transmittance and the standard exposure intensities have been determined, the software examines the image format information and calibrates the exposure intensity. For this purpose, step 160 causes the microprocessor 24 to look at the cartridge disk drive and determine the format of the images stored thereon. This is done solely with respect to the number of lines per frame. Step 162 then determines the exposure format, the number of successive exposure lines per image line and the spacing thereof. With the vertical exposure format determined, step 164 can then proceed with calibrating the black and white intensity levels.

Step 166 causes a test pattern to be generated on CRT 80 which is sensed by photodiode 88. The signal therefrom is converted by A/D 122 and fed to microprocessor 24 where it is compared against the stored white, reference exposure intensity reading. During this comparison, the most through least significant bits of register 62 are successively approximated until the converted reading from photodiode 88 matches the white reference exposure intensity. Step 168 likewise repeats this process in comparison with the black reference exposure intensity.

Step 170 takes the twelve bit DAC values determined to produce the reference exposure intensities and loads them into look-up table 56 as the black and white DAC values. Microprocessor 24 then calculates or otherwise determines intermediate DAC values and likewise loads them into table 56.

Step 172 again checks the image data format and determines the horizontal pixel output rate for frame memory 40. Step 174 then loads a frame of image data from the disk into frame memory 40. Lastly, step 174 causes the image data to be appropriately clocked out of memory 40 to DAO 90 while the horizontal and vertical sync signals 104, 106 control the location of the ORT beam and the image is printed.

The above embodiments are intended to be taken in an illustrative and not a limiting sense. Various modifications and changes may be made to these embodiments by persons skilled in the art without departing from the present invention as defined in the appended claims. Such modifications may include the use of analog instead of digitized image data.

CONCLUSION

Thus, an apparatus is provided for "hard copy" cameras which readily implements calibration of the exposure intensity of the light source. The calibration measurement is averaged over both area and time to prevent minor irregularities from affecting the result. The successive approximation method provides a quick measurement which does not significantly hinder the operation of the apparatus, while still allowing averaging of the measurement over time.

What is claimed is:

1. An apparatus for creating an image on photographic film, said apparatus comprising:
    (a) light source means, responsive to a drive signal, for providing light so that the exposure of different portions of said film to said light can be varied as a function of said drive signal so as to vary the transmittance of the portions of the film;
    (b) means for measuring the exposure intensity of said light and for generating a measured intensity signal representative of the value of said measured intensity;
    (c) comparison means for comparing the value of said measured intensity signal with the value of a predetermined desired intensity;
    (d) means for generating said drive signal including means for generating said drive signal in a digital form of a predetermined number of bits varying from a most significant bit to a least significant bit;
    (e) calibration means for calibrating the value of said measured intensity signal with the value of said predetermined desired intensity signal with the value of said predetermined desired intensity signal by successively approximating the digital signal of said drive signal so as to vary said drive signal until the value of the measured intensity signal approximates the value of said desired intensity signal.

2. Apparatus according to claim 1, wherein said light source means includes means for generating said light as a scanning beam for scanning said film.

3. Apparatus according to claim 2, wherein said light source means includes a cathode ray tube.

4. Apparatus according to claim 2, wherein said light source means includes a laser.

5. Apparatus according to claim 1, wherein said means for generating said drive signal includes (a) means for generating said drive signal in said digital form and (b) digital to analog conversion means for converting said drive signal in said digital form to an analog signal; and wherein said light source means is responsive to said analog signal.

6. Apparatus according to claim 5, further including analog to digital conversion means for converting an analog signal to a digital signal, and means for applying each of said measured intensity signals to said analog to digital conversion means for generating each of said measured intensity signals as digital signals.

7. Apparatus according to claim 6, wherein said analog to digital means generates aid measured intensity signals as digital signals as a function of the average of the amount of light measured by the means for measuring the intensity of said light over a predetermined period of time.

8. Apparatus according to claim 7, wherein said analog to digital means includes a dual-slope converter.

9. Apparatus according to claim 1, wherein said calibration means successively approximates the digital signal of said drive signal from the most to the least significant of said bits until the value of the measured intensity signal approximates the value of said desired intensity signal.

* * * * *

UNITED STATES PATENT AND TRADEMARK OFFICE
CERTIFICATE OF CORRECTION

PATENT NO. : 5,021,979
DATED : June 4, 1991
INVENTOR(S) : Richard C. Rice

It is certified that error appears in the above-identified patent and that said Letters Patent is hereby corrected as shown below:

Claim 1, column 11, lines 36-37, delete "with the value of said predetermined desired intensity signal"; and Claim 7, column 12, line 25, delete "aid" and insert therefor -- said --.

Signed and Sealed this

Twenty-second Day of September, 1992

Attest:

DOUGLAS B. COMER

*Attesting Officer*     *Acting Commissioner of Patents and Trademarks*